UNITED STATES PATENT OFFICE.

FREDRICK J. NICE, OF PONTIAC, MICHIGAN.

FURNACE.

1,082,898.   Specification of Letters Patent.   Patented Dec. 30, 1913.

Application filed February 12, 1913. Serial No. 747,834.

*To all whom it may concern:*

Be it known that I, FREDRICK J. NICE, a citizen of the United States, residing at Pontiac, county of Oakland, State of Michigan, have invented a certain new and useful Improvement in Furnaces, and declare the following to be a full, clear, and exact description of the same, such as will enable others skilled in the art to which it pertains to make and use the same, reference being had to the accompanying drawings, which form a part of this specification.

This invention relates to furnaces in general and especially to crucible furnaces and has for its object a furnace that is economical in operation and which attains very high temperatures.

One of the important features of this invention is the preliminary heating of the pots before they are introduced into the main heating chamber, so that it is not necessary to melt the metal from a cold condition.

Another feature is the construction and arrangement of three chambers which will be more fully explained hereinafter.

Figure 1:
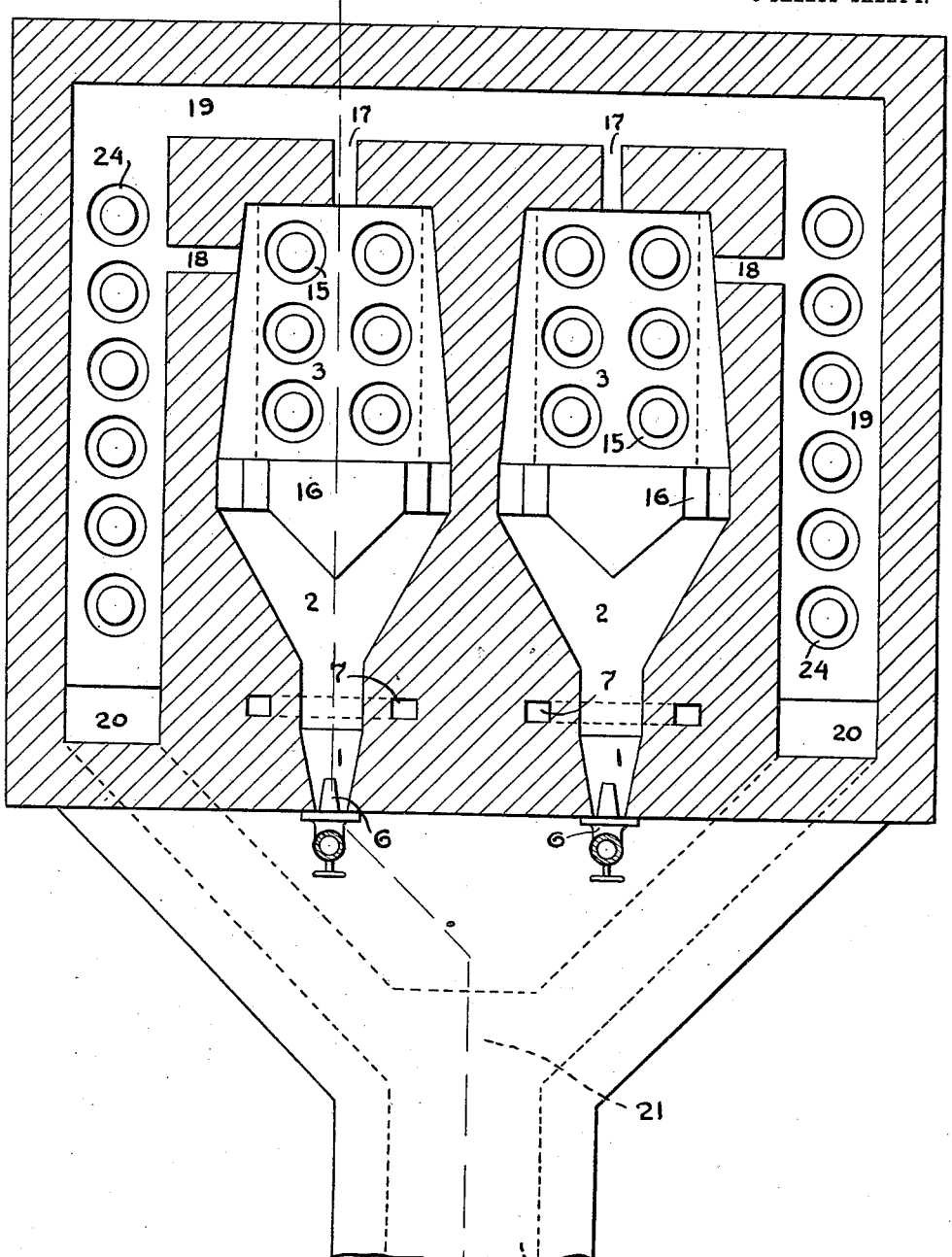
Figure 2:
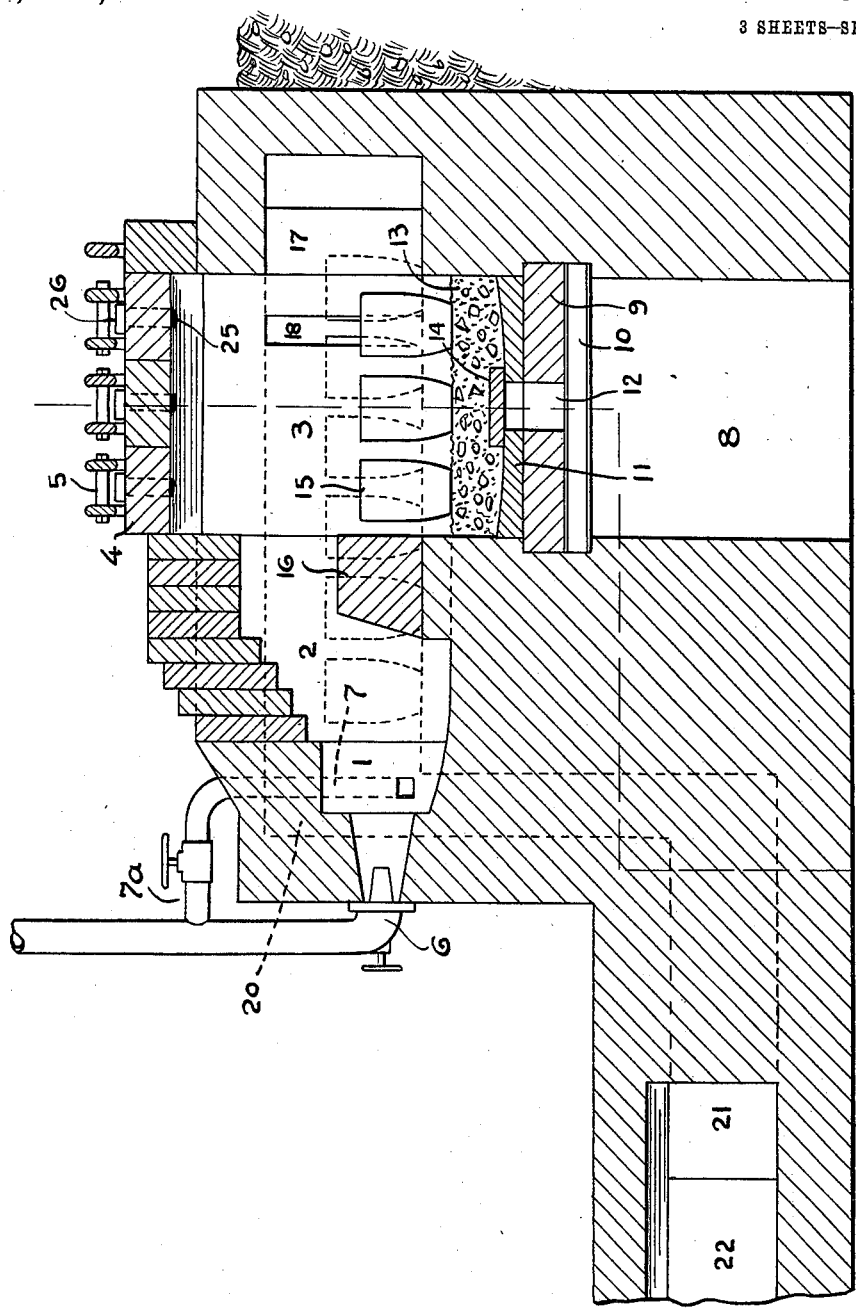
Figure 3:
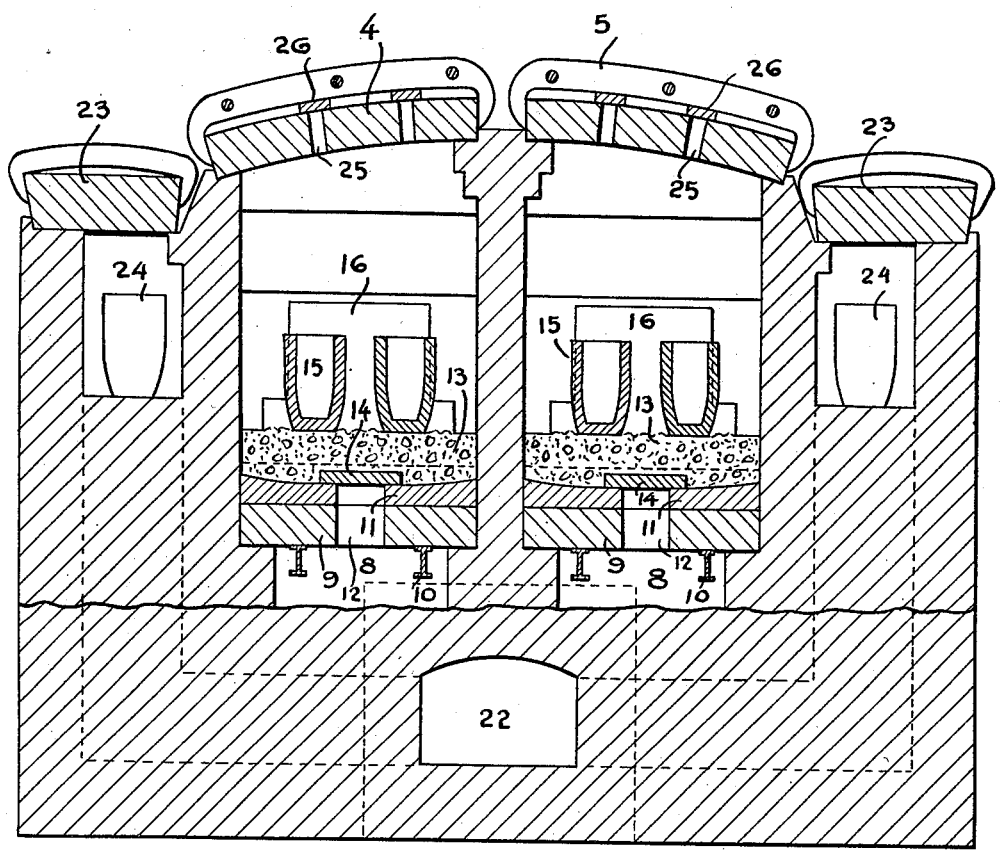

In the drawings:—Figure 1, is a horizontal section and a plan view of the furnace. Fig. 2, is a vertical section lengthwise the furnace. Fig. 3, is a vertical cross section of the furnace.

The furnace walls are constructed of fire bricks which have a maximum capacity for withstanding high temperatures. The walls are built to form three chambers, one of which I shall designate the preparatory chamber (indicated as 1), a second, the preparatory-combustion chamber 2, and a third, the main-heating chamber 3 (Fig. 2). Fire bricks extend over the preparatory-combustion chamber 2, while the main heating chamber 3 is closed by lids or covers 4 that are provided with handles 5 by which they may be lifted off when access to the interior is desired. A burner 6 opens into the mouth of the preparatory chamber 1. This is an oil burner and is fed with blown air (pressure about 32 ounces) and oil and contains suitable regulatory means by which the amount of fuel and air supply may be regulated to control the heat within the furnace.

The shape and division of the chambers is important. Referring to Fig. 1, it is seen that the walls of the furnace near the burner 6 start to diverge, then they run nearly parallel again. These walls inclose the preparatory or gasifying chamber 1. I am aware that it is not novel to use a space for fuel to be divided and mixed with air, but I am not aware of a use such as my preparatory chamber 1. This chamber is not part of the burner, but a part of the furnace and is heated by the hot walls of the furnace and the burning gases rolling back from the preparatory-combustion chamber 2. This heating, of course, tends to more fully gasify the fuel and put it into condition for ready combustion, so that a much larger amount of air can be used with a given unit of fuel than is prescribed by the standards of shop-practice. The next chamber or that space formed by the walls again diverging is the preparatory-combustion chamber. I call it the preparatory-combustion chamber for the reason that some mixture of the air and the fuel takes place here, although mainly the combustion. This chamber is divided from the main heating chamber 3 by the baffle wall 16 which serves to break up the burning gases and the air rushing in serves to spread the flame into all parts of the furnace whereby uniformity and intense heat is secured. The main heating chamber 3 is located beyond the baffle wall 16 and is bounded on the sides by the converging walls, shown in Fig. 1, in the rear by the rear wall of the furnace and in front by the baffle wall 16. The crucibles 15 lie behind the baffle wall and are protected from the blast from the burner and the fuel is so broken up by the baffle wall and spread by the force of the air that it is carried to the crucibles without injuring them, in fact, the unusual result of again heating crucibles in which the melted steel has been allowed to solidify can be accomplished. Additional air for combustion is supplied from the controllable air pipe 7ª to the preparatory chamber 1 through the passage way 7 that leads from the top of the furnace down at the sides of the preparatory chamber and thence into the preparatory chamber. This air is heated by contact with the hot wall of the furnace.

Below the main-heating chamber 3 is located the slag pit 8 and this is divided off from the main-heating chamber 3 by the cast iron floor 9 which is supported by the I-beams 10. Over the cast iron floor 9 is a layer of ganister or ground fire-brick 11. A slag hole 12 penetrates through the ganister and the center of the cast iron floor. Upon the layer of ganister is packed coke-breeze, indicated at 13. This is prevented from falling through the slag hole 12 by the cover plate 14. The slag pit and the slag hole are intended for use when the crucible, coke-breeze or fire bricks slag away under the intense heat. This slag may be emptied from the main-heating chamber by poking the cover 14 away from the slag hole 12 and then poking the residuum in the chamber or allowing the slag to run through the hole 12. This operation may also become necessary when one of the pots is spilled or breaks.

The crucibles 15 which are made of plumbago or other heat-resisting material are set in two rows of three each as shown in Fig. 1.

In the drawings, I have shown two furnaces grouped together which is one of my preferred forms of construction, but the feature that I am just about to describe may be employed in connection with a single furnace. This feature consists of preventing the radiation of heat by insheathing the sides and back of the furnace with lead-away flues. Referring to Fig. 1, the passage way 17 will be noticed at about the center of the back of the main heating chamber and the passage way 18 will be noted at the side near the back of the main heating chamber. These passage ways lead into the lead-way flue 19 which insheathes the back of the furnace and side and which is almost as deep as the main-heating chamber. This lead-way flue extends on the left side to the front of the furnace adjacent the burner to a point 20 where it dives below the level of the bottom of the main-heating chamber. Similarly a lead-way flue leads from the back of the furnace (at the right of Fig. 1) and about the right side to a point 20 where it dives below the level of the floor of the main-heating chamber. These two lead-away flues join at 21 in the common flue 22, which discharges into a stack, not shown. The flues serve also to heat the air passages 7 and the preparatory chamber 1. It will, of course, be understood that the two flues may insheath one furnace as well as two.

These oil-burning furnaces furnish intense heat and the substances in processes of combustion and the products of combustion shoot with great force through the preparatory chamber into the preparatory-combustion chamber and main-heating chamber; in fact, the flame reaches out through any crevices or openings that there may be about the furnace. It is my idea instead of allowing these substances that are in process of combustion to escape through the flues and thereby lose considerable heat, to conduct them in the form of a sheathe about one or all of the chambers so as not only to add to the heat by their proximity to these chambers, but to also form a sheathing for the sides and back of the furnace to prevent the radiation of the heat that is produced within the chambers. I find that by the use of this sheathing of the substances in process of combustion and the products of combustion that a very high temperature may be attained in my furnace, in fact, a fairly dark purple heat may be attained.

Each of the crucibles may be filled with from 140 to 170 pounds of steel punchings or other waste steel and the steel in these six crucibles for each furnace may be melted in about one hour and fifty minutes and I find that I have a very high grade of molten steel for casting. I also find that I can get four and five heatings out of the crucibles before they become unfit for use, as against three in common shop-practice.

Another feature of my furnace is that I can enlarge the side lead-away flues as shown in Fig. 1 and set in each of these six crucibles for preliminary heating so that when a batch of crucibles in the main-heating chambers or chamber are removed, the crucibles which have been preliminarily heated may be set down in the main-heating chamber and the process of melting will be considerably lessened as to time. This is, of course, an economical and important feature for it both lessens the time in which the fuel is burned and it also lengthens the life of the crucibles by lessening the time in which they are subjected to the intense heat of the main-heating chamber.

Lids 23 cover the side lead-away flues so that access may be had to the crucibles 24 that are being preliminarily heated. The covers 4 have feed-holes 25, stopped by pieces of brick 26. These are used to look into each crucible and to feed any constituent through when desired.

I have described the shape of my furnace, the sheathing, the chambers, etc., with reference to a crucible furnace, but it may be easily adapted for other furnace work and I do not want to be limited to crucible furnaces alone, but want to be understood as claiming the structure wherein my newly discovered principles are introduced as applied to all uses.

What I claim is:—

1. A furnace, having in combination, walls shaped to form a narrow preparatory chamber, at one end of which the walls diverge to form a preparatory-combustion chamber and a baffle wall separating said preparatory combustion chamber from a larger substantially rectangular chamber that forms a main heating chamber, the said walls being also formed with leadaway flues which lead from a passage way at the back of the main combustion chamber on either side of the main heating chamber, the preparatory combustion chamber and preparatory chamber to the front of the furnace, the said lead-away flues communicating with the main heating chamber on at least one side and being of the depth sufficient to substantially insheathe the said three chambers, a burner located at the end of the preparatory chamber opposite the preparatory - combustion chamber, and covers removably attached to the furnace walls so that access can be had to the main heating chamber and also to the leadaway flues whereby the leadaway flues may be used for preliminary heating as well as insheathing of the chambers to prevent radiation of heat, substantially as described.

2. A furnace comprising refractory material forming a narrow preparatory chamber, a preparatory combustion chamber beyond said preparatory chamber and formed by the walls diverging from the walls of the preparatory chamber and a substantially rectangular main heating chamber located beyond the preparatory combustion chamber and divided therefrom by a baffle wall, the said refractory material forming also passage ways leading down from the top of the furnace on either side of the preparatory chamber and discharging thereinto, a burner located at the end of the preparatory chamber opposite the preparatory combustion chamber and a pipe for furnishing air to the said burner and to each of the passage ways leading into the preparatory chamber, substantially as described.

In testimony whereof, I sign this specification in the presence of two witnesses.

FREDRICK J. NICE.

Witnesses:
STUART C. BARNES,
AMELIA C. KOEHN.

Copies of this patent may be obtained for five cents each, by addressing the "Commissioner of Patents, Washington, D. C."